United States Patent
Tollinger et al.

(10) Patent No.: US 9,298,677 B2
(45) Date of Patent: Mar. 29, 2016

(54) DELIVERING TARGETED ADVERTISING TO MOBILE DEVICES

(75) Inventors: Preston Tollinger, Los Altos, CA (US); Brent Dusing, Milpitas, CA (US)

(73) Assignee: Cellfire Inc., San Jose, CA (US)

( * ) Notice: Subject to any disclaimer, the term of this patent is extended or adjusted under 35 U.S.C. 154(b) by 0 days.

(21) Appl. No.: 12/639,609

(22) Filed: Dec. 16, 2009

(65) Prior Publication Data

US 2010/0138303 A1 Jun. 3, 2010

Related U.S. Application Data

(62) Division of application No. 11/349,037, filed on Feb. 6, 2006.

(60) Provisional application No. 60/650,363, filed on Feb. 4, 2005.

(51) Int. Cl.
| | |
|---|---|
| G06F 3/00 | (2006.01) |
| G06F 17/21 | (2006.01) |
| G06F 17/24 | (2006.01) |
| G06F 17/30 | (2006.01) |
| G06Q 30/02 | (2012.01) |
| H04M 3/487 | (2006.01) |

(52) U.S. Cl.
CPC .......... *G06F 17/212* (2013.01); *G06F 17/248* (2013.01); *G06F 17/30867* (2013.01); *G06Q 30/02* (2013.01); *G06Q 30/0212* (2013.01); *G06Q 30/0226* (2013.01); *G06Q 30/0255* (2013.01); *G06Q 30/0267* (2013.01); *G06Q 30/0269* (2013.01); *G06Q 30/0276* (2013.01); *H04M 3/4878* (2013.01)

(58) Field of Classification Search
CPC .......... G06Q 30/0272; G06Q 30/0273; G06Q 30/0277; G06Q 30/0255; G06Q 30/03; G06Q 30/0212; G06Q 30/0336; G06Q 30/0267; G06Q 30/0269; G06Q 30/0276; G06F 17/30011; G06F 17/3089; G06F 17/30876; G06F 17/212; G06F 17/248; G06F 17/3087; H04M 3/4878
USPC ................... 715/234, 235, 236, 243, 254, 255
See application file for complete search history.

(56) References Cited

U.S. PATENT DOCUMENTS

| | | |
|---|---|---|
| 5,353,218 A | 10/1994 | De Lapa |
| 5,710,886 A | 1/1998 | Christensen |

(Continued)

FOREIGN PATENT DOCUMENTS

| | | |
|---|---|---|
| JP | 2002288506 | 10/2002 |
| KR | 1020050092682 | 9/2005 |

(Continued)

OTHER PUBLICATIONS

DeBolt, Virginia, "Integrated HTML and CSS: A Smarter, Faster Way to Learn," Jan. 2005, Sybex, pp. 15-29.*

(Continued)

*Primary Examiner* — Kyle Stork
(74) *Attorney, Agent, or Firm* — Sheppard Mullin Richter & Hampton LLP

(57) ABSTRACT

A method for loading a layout with advertising item data is provided. Layout header data is parsed. A layout item object is then built. Global layout variables are replaced with values. Local layout variables are replaced with data from content objects. Displayed data is then created.

15 Claims, 12 Drawing Sheets

(56) References Cited

U.S. PATENT DOCUMENTS

| | | | |
|---|---|---|---|
| 5,754,176 A | 5/1998 | Crawford | |
| 5,822,735 A | 10/1998 | De Lapa | |
| 5,857,175 A | 1/1999 | Day | |
| 5,970,469 A | 10/1999 | Scroggie | |
| 6,026,370 A | 2/2000 | Jermyn | |
| 6,035,280 A | 3/2000 | Christensen | |
| 6,041,309 A | 3/2000 | Laor | |
| 6,041,311 A | 3/2000 | Chislenko et al. | |
| 6,055,573 A | 4/2000 | Gardenswartz | |
| 6,061,060 A | 5/2000 | Berry et al. | |
| 6,076,069 A | 6/2000 | Laor | |
| 6,185,541 B1 | 2/2001 | Scroggie | |
| 6,278,979 B1 | 8/2001 | Williams | |
| 6,298,330 B1 | 10/2001 | Gardenswartz | |
| 6,321,208 B1 | 11/2001 | Barnett | |
| 6,336,099 B1 | 1/2002 | Barnett | |
| 6,385,591 B1 | 5/2002 | Mankoff et al. | |
| 6,467,686 B1 | 10/2002 | Guthrie et al. | |
| 6,484,146 B2 | 11/2002 | Day | |
| 6,487,538 B1 | 11/2002 | Gupta et al. | |
| 6,493,110 B1 | 12/2002 | Roberts | |
| 6,584,448 B1 | 6/2003 | Laor | |
| 6,647,269 B2 | 11/2003 | Hendry et al. | |
| 6,670,687 B2 | 12/2003 | Satoh | |
| 6,671,732 B1 | 12/2003 | Weiner | |
| 6,679,421 B2 | 1/2004 | Shin et al. | |
| 6,736,322 B2 | 5/2004 | Gobburu et al. | |
| 6,753,887 B2 | 6/2004 | Carolan et al. | |
| 6,882,442 B2 | 4/2005 | Roberts | |
| 6,885,994 B1 | 4/2005 | Scroggie | |
| 6,954,732 B1 | 10/2005 | De Lapa | |
| 6,968,513 B1* | 11/2005 | Rinebold et al. | 715/854 |
| 6,996,579 B2 | 2/2006 | Leung et al. | |
| 7,003,734 B1 | 2/2006 | Gardner et al. | |
| 7,047,502 B2 | 5/2006 | Petropoulos et al. | |
| 7,089,530 B1* | 8/2006 | Dardinski et al. | 717/105 |
| 7,184,972 B2 | 2/2007 | Flaherty | |
| 7,228,285 B2 | 6/2007 | Hull | |
| 7,233,913 B2 | 6/2007 | Scroggie | |
| 7,236,942 B1 | 6/2007 | Walker et al. | |
| 7,346,606 B2 | 3/2008 | Bharat | |
| 7,346,615 B2 | 3/2008 | Bem | |
| 7,370,002 B2 | 5/2008 | Heckerman et al. | |
| 7,398,248 B2 | 7/2008 | Phillips | |
| 7,415,426 B2 | 8/2008 | Williams | |
| 7,421,504 B2 | 9/2008 | Imaida | |
| 7,499,948 B2 | 3/2009 | Smith et al. | |
| 7,552,458 B1 | 6/2009 | Finseth et al. | |
| 7,599,850 B1 | 10/2009 | Laor | |
| 7,653,594 B2 | 1/2010 | Davis | |
| 7,711,834 B2* | 5/2010 | Gormish | 709/229 |
| 8,595,056 B2 | 11/2013 | Sohya et al. | |
| 2001/0051911 A1 | 12/2001 | Marks et al. | |
| 2002/0040316 A1 | 4/2002 | Shin et al. | |
| 2002/0040341 A1 | 4/2002 | Shin et al. | |
| 2002/0049635 A1* | 4/2002 | Mai | G06Q 30/0269 705/14.66 |
| 2002/0065713 A1 | 5/2002 | Awanda et al. | |
| 2002/0091569 A1 | 7/2002 | Kitaura et al. | |
| 2002/0111172 A1 | 8/2002 | DeWolf et al. | |
| 2002/0120505 A1 | 8/2002 | Henkin et al. | |
| 2002/0161646 A1 | 10/2002 | Gailey et al. | |
| 2003/0004802 A1 | 1/2003 | Callegari | |
| 2003/0032409 A1 | 2/2003 | Hutcheson et al. | |
| 2003/0033292 A1 | 2/2003 | Meisel et al. | |
| 2003/0046156 A1 | 3/2003 | Cromer et al. | |
| 2003/0046161 A1 | 3/2003 | Kamangar et al. | |
| 2003/0058261 A1 | 3/2003 | Challa et al. | |
| 2003/0064713 A1 | 4/2003 | Deshpande | |
| 2003/0078966 A1* | 4/2003 | Kinjo | 709/203 |
| 2003/0088525 A1 | 5/2003 | Velez | |
| 2003/0093314 A1 | 5/2003 | Leung et al. | |
| 2003/0115152 A1 | 6/2003 | Flaherty | |
| 2003/0144035 A1 | 7/2003 | Weinblatt et al. | |
| 2003/0146939 A1 | 8/2003 | Petropoulos et al. | |
| 2003/0233276 A1 | 12/2003 | Pearlman et al. | |
| 2004/0137886 A1 | 7/2004 | Ross et al. | |
| 2004/0141011 A1 | 7/2004 | Smethers et al. | |
| 2004/0181555 A1* | 9/2004 | Ratner et al. | 707/200 |
| 2004/0254836 A1 | 12/2004 | Barabas et al. | |
| 2004/0260577 A1* | 12/2004 | Dahlin et al. | 705/2 |
| 2004/0260911 A1* | 12/2004 | Chauvel et al. | 712/216 |
| 2005/0071224 A1 | 3/2005 | Fikes et al. | |
| 2005/0086104 A1 | 4/2005 | McFadden | |
| 2005/0092839 A1 | 5/2005 | Oram | |
| 2005/0119949 A1 | 6/2005 | Campagna | |
| 2005/0131761 A1 | 6/2005 | Trika et al. | |
| 2005/0165642 A1 | 7/2005 | Brouze et al. | |
| 2005/0222905 A1* | 10/2005 | Wills | 705/14 |
| 2005/0222906 A1 | 10/2005 | Chen | |
| 2006/0004628 A1 | 1/2006 | Axe et al. | |
| 2006/0036491 A1 | 2/2006 | Leung et al. | |
| 2006/0041638 A1* | 2/2006 | Whittaker et al. | 709/219 |
| 2006/0095424 A1 | 5/2006 | Petropoulos et al. | |
| 2006/0143067 A1* | 6/2006 | Calabria | 705/10 |
| 2006/0149622 A1 | 7/2006 | Baluja et al. | |
| 2006/0156283 A1* | 7/2006 | Landau et al. | 717/114 |
| 2006/0190330 A1 | 8/2006 | Tollinger et al. | |
| 2006/0190331 A1 | 8/2006 | Tollinger et al. | |
| 2006/0259360 A1 | 11/2006 | Flinn et al. | 705/14 |
| 2006/0294084 A1 | 12/2006 | Patel et al. | |
| 2007/0038509 A1 | 2/2007 | Jain | |
| 2007/0061197 A1 | 3/2007 | Ramer | |
| 2007/0061242 A1 | 3/2007 | Ramer et al. | |
| 2007/0249330 A1 | 10/2007 | Cortegiano | |
| 2007/0250383 A1 | 10/2007 | Tollinger et al. | |
| 2009/0030779 A1 | 1/2009 | Tollinger et al. | |
| 2009/0070207 A1 | 3/2009 | Engel et al. | |
| 2010/0088166 A1 | 4/2010 | Tollinger et al. | |
| 2010/0138299 A1 | 6/2010 | Preston et al. | |

FOREIGN PATENT DOCUMENTS

| | | |
|---|---|---|
| WO | WO 01/71949 | 9/2001 |
| WO | 2008021382 | 2/2008 |

OTHER PUBLICATIONS

Office Action mailed on Jul. 20, 2010 issued against U.S. Appl. No. 11/898,197.
Office Action mailed on May 26, 2010 issued against U.S. Appl. No. 11/408,599.
Final Office Action of related U.S. Appl. No. 11/349,037 (mailed Mar. 24, 2010).
Final Office Action of related U.S. Appl. No. 11/349,050 (mailed Feb. 25, 2010).
International Patent Application No. PCT/US09/55653 International Search Report and Written Opinion (mailed Apr. 20, 2010).
Interview Summary of related U.S. Appl. No. 11/349,037 (mailed Jan. 12, 2010).
Interview Summary of related U.S. Appl. No. 11/349,050 (mailed Jan. 12, 2010).
Non-Final Office Action of related U.S. Appl. No. 12/212,530 (mailed Dec. 21, 2009).
Non-Final Office Action of related U.S. Appl. No. 11/349,037 (mailed Aug. 18, 2009).
Non-Final Office Action of related U.S. Appl. No. 11/349,050 (mailed Aug. 19, 2009).
Non-Final Office Action of related U.S. Appl. No. 11/349,050 (mailed Oct. 13, 2009).
Non-Final Office Action of related U.S. Appl. No. 11/349,037 (mailed Nov. 6, 2009).
"IEEE 100 The Authoritative Dictionary of IEEE Standards Terms Seventh Edition", Date of Publication: 2000, p. 1176.

* cited by examiner

DELIVERING TARGETED ADVERTISING TO MOBILE DEVICES

CROSS-REFERENCE TO RELATED APPLICATION

The present application is a divisional application of U.S. application Ser. No. 11/349,037 filed Feb. 6, 2006, which claims the benefit of U.S. Provisional Application Ser. No. 60/650,363 filed Feb. 4, 2005, each of which is incorporated by reference herein in its entirety for all purposes.

FIELD OF THE INVENTION

This invention relates generally to systems and methods associated with portable devices, and more particularly to systems and methods associated with portable devices to deliver target advertising:

DESCRIPTION OF THE RELATED ART

Currently general advertising on portable devices is delivered only as Short Message Service (SMS) or text messages. These messages can only contain plain text and are delivered to the SMS inbox provided by most portable devices. They go into the general inbox that contains all messages received by that device from any source. There is no ability to track which advertisements or coupons are read or deleted or, in fact, any confirmation that the user even looked in the SMS inbox.

Advertising is also delivered as part of streaming video (ie. TV) on some mobile devices, however it acts like current TV adverting, where it interrupts the content with the advertisement and there is no ability to target different ads to different demographics nor any way to interact with the advertising.

SUMMARY

Accordingly, an object of the present invention is to provide improved methods for delivering advertising items to a client at the client's portable device.

Another object of the present invention is to provide improved methods for delivering coupons to a client's portable device.

Yet another object of the present invention is to provide improved methods for making coupon recommendations to a client using client demographic and client historical data.

A further object of the present invention is to provide improved methods for displaying layouts with advertising item data at a client's portable device.

Another object of the present invention is to provide improved methods for allowing customers to manage their advertising campaigns.

Yet another object of the present invention is to provide improved methods for downloading advertising items to a portable device of a client.

These and other objects of the present invention are achieved in a method for loading a layout with advertising item data. Layout header data is parsed. A layout item object is then built. Global layout variables are replaced with values. Local layout variables are replaced with data from content objects. Displayed data is then created.

In another embodiment of the present invention, a method is provided for allowing customers to manage their advertising campaigns. A client delivered advertising item is delivered relative to a product or service of a customer. A new demographic profile is created for client targeting. A new advertising campaign is created that links content deliverables and demographic profiles relative to the advertising item. The new advertising campaign is launched. The advertising campaign results are then viewed by the customer.

In another embodiment of the present invention, a method is provided of downloading advertising items from a host server to a portable device of a client. A client's device information, relative to the client's portable device, is received at the host server. A determination is made, from the client's device information, the model or version of the client's portable device. In response to the step of determining, a client ID is embedded in the client's portable device. Client software is delivered from the host server to the client's portable device. The client software is used for downloaded advertising items relative to a product or service from the host server to the client's portable device.

DETAILED DESCRIPTION

Figure 9:
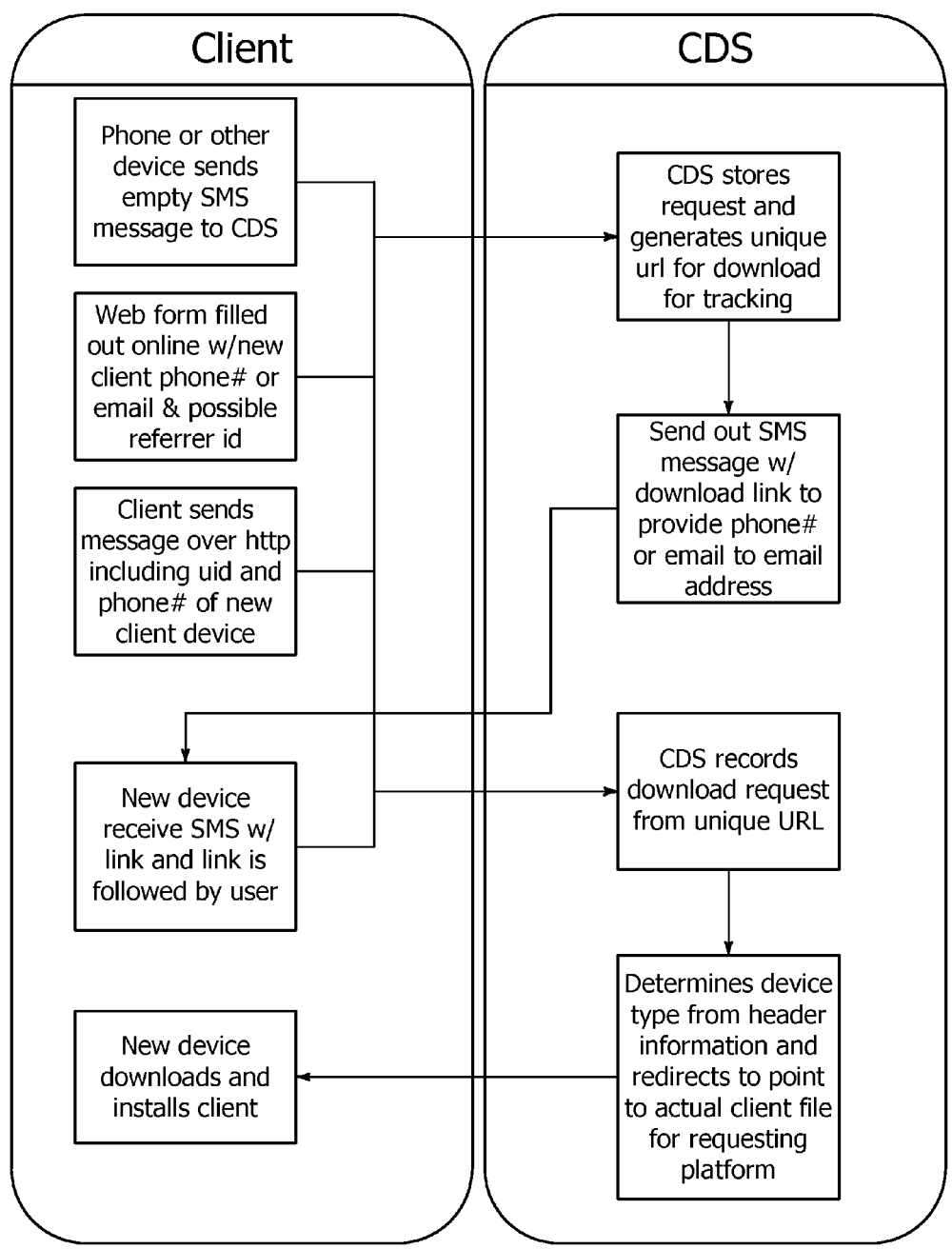
FIG. 9 is a flow chart illustrating one embodiment of a method for the delivery of client software to a client at a portable device of the present invention.

In one embodiment of the present invention, illustrated in FIG. 9, a method is provided for the delivery of software for the delivery of advertising items to a client at a portable device. Suitable portable devices include but are not limited to, cell phone, personal digital assistants (PDA's), smart devices, personal portable devices and the like. This can be implemented over a network connection, downloaded via cable or over a Bluetooth connection, come preinstalled by the phone operating system (OS) manufacture or distributor, and the like.

Figure 1:
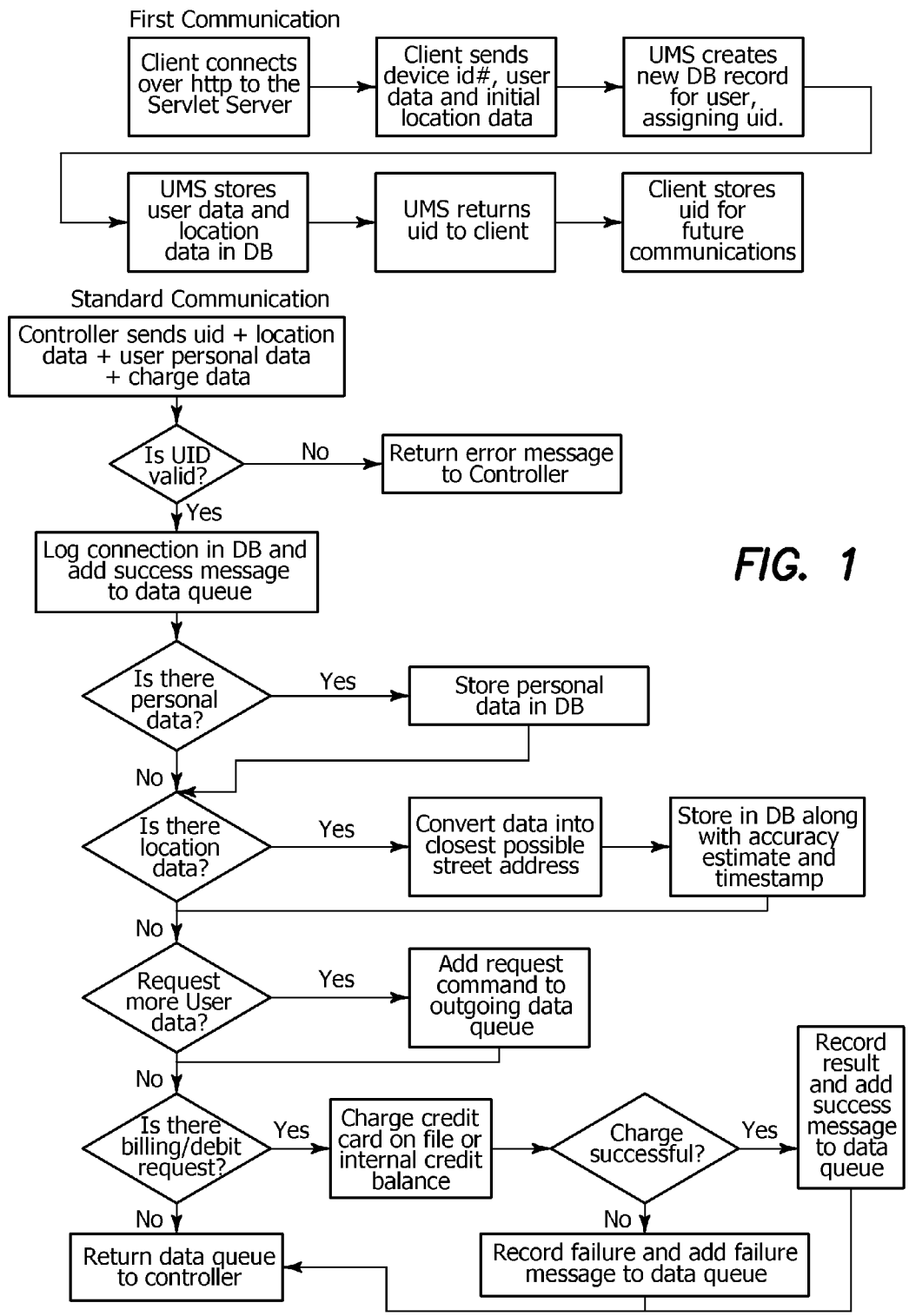
FIG. 1 is a flow chart illustrating a high level view of a communication between a client and the host server of the present invention.
Figure 2:
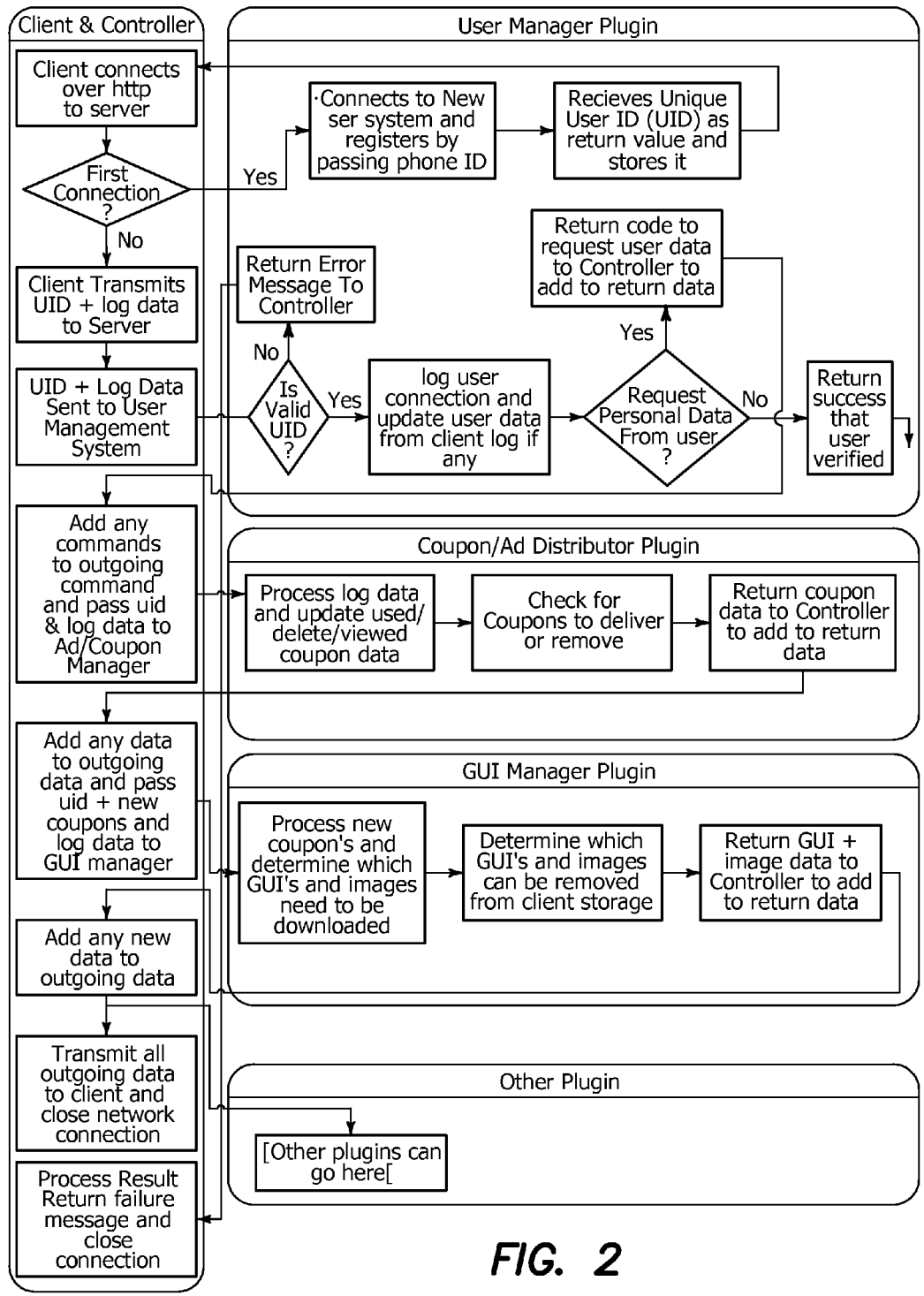
FIG. 2 is a flow chart illustrating one embodiment of method of delivering advertising to a client at a portable device in one embodiment of the present invention.

A client ID is sent to a host server. A downloaded advertising item is produced relative to a product or service from the host server, as illustrated in FIG. 2. The downloaded advertising item is parsed and stored. In response to the parsing and storing, displaying the advertising item is displayed to the client at the mobile device.

The displayed advertising item includes at least one of, a list of merchants, special event data, a coupon, an ad, a contest, a loyalty card (FIG. 3), and the like. The downloaded advertising item includes both layout and content information.

When the client first starts an application, a network connection with the host server begins in the background. This network connection reaches the host server both to upload and download data. All logged information is uploaded, including but not limited to each advertising item, such as a coupon, used, deleted and viewed by the client and how often. The amount of free space available on the client's portable device is also uploaded. Addition data can be attached including but not limited to the current global positioning system (GPS) coordinates of the client's portable device. Client requests are uploaded. By way of illustration, and without limitation, these client request can include, requests to install the client on a different portable device, specifically requested advertising items, personal data entered, and the like. Advertising items can be requested by entering a short code, waving a Bluetooth® enabled device over a transmitter, taking a picture of a code, such as a barcode or other machine readable picture, with the client's portable device's built in camera. This can then be translated into a code to be uploaded, received as an infrared (IR) signal via an IR receiver or any other reasonable input method into the client's portable device.

Figure 3:
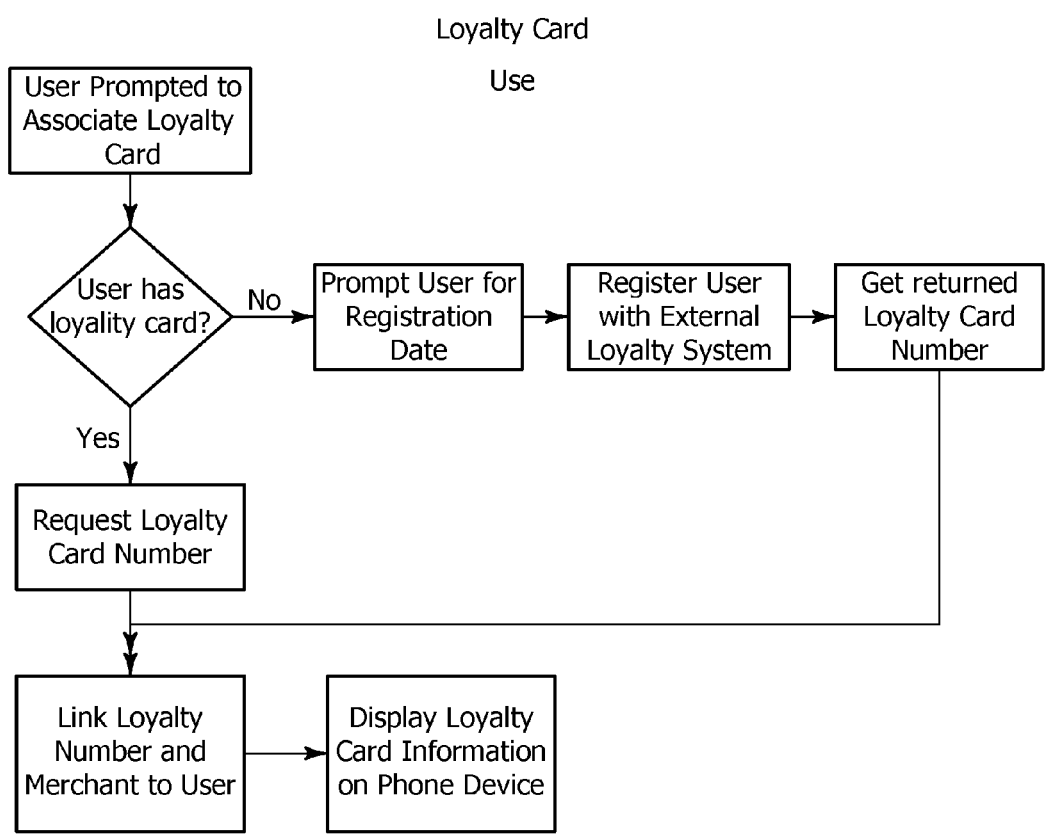
FIG. 3 is a flow chart illustrating the use of loyalty cards in one embodiment of the present invention.

As shown in FIG. 3, the client can link its loyalty card or information to the host server, through their portable device, and the like. The portable device, and the like, is used to provide the client ID at the point of sale. The loyalty data linked to the ID can be used by the host server to provide custom content, including but not limited to, discounts, special events, and the like, in response to the client's previous purchasing history. The client's portable device can be used to track a client's progress towards a goal, e.g., buy 10, get the 11th free, and the like.

Figure 4:
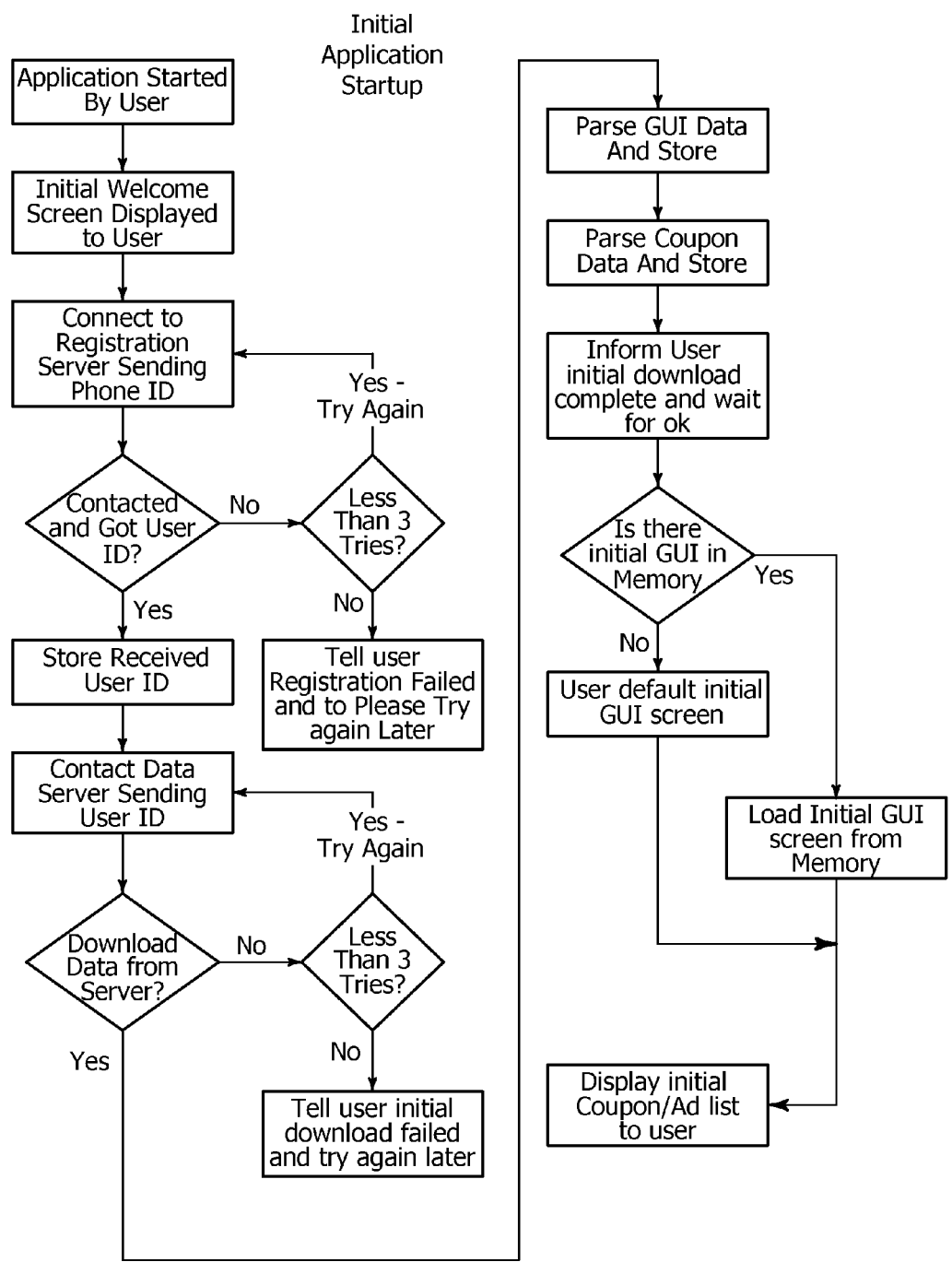
FIG. 4 is a slow chart illustrating one embodiment of an initial application startup of the present invention.

A portable device application is downloaded from the host computer and installed on the client's portable device. An application can be run by the client that is prompted for the client's personalized information. Such personal information can include, but it not limited to the client's, zip code, age, gender, address, contact information, preferences, and the like. One instance of how the initial flow can work can be see in FIG. 4.

In producing the downloaded advertising item, data of the client's actions and the client's non-actions is processed at the server from previous client activity. The client's actions and non-actions for the advertising item are then updated and stored at the host server. In response to the updating, the new advertising item is sent to the client.

During parsing, the host server can pre-format the advertising item for easier client use. By way of illustration, and without limitation, the host server can place the content to be delivered in a specific fixed order, delimited by a special character. The client can then easily iterate across this list, parsing and placing each element into an array in the same order. The client can use the same previous knowledge about the order to index into that array, to load any specific element. The data in the same form can be stored for later retrieval using the same method.

The data can be transmitted in an extremely compact form. By way of illustration, and without limitation, one method is to have a list of values, delimited by a special character, with each addition position representing a different element of data. By way of illustration, a coupon can be represented as follows:

434:101:1:10:2:1:3:Acme Warehouse:4:Get $10 of at Acme!:5:010106:6: Can not be combined with any other offers. Void where prohibited.

In addition, a string of suitable length can be first compressed. Many other characters can also be a delimiter. Some delimiters could also be removed by fixed the length of ids, so that the first part above could be transmitted as "434101". If the amount of data transmitted can not be as constrained, the Extensible Markup Language (XML) given above can also be transmitted as is.

In a case where a string (for instance the small print string with type_id 6 above) is already on the client, instead of transmitting the string again, a code number can be transmitted representing the coupon for which the string already exists that should be used for this coupon.

Figure 5:
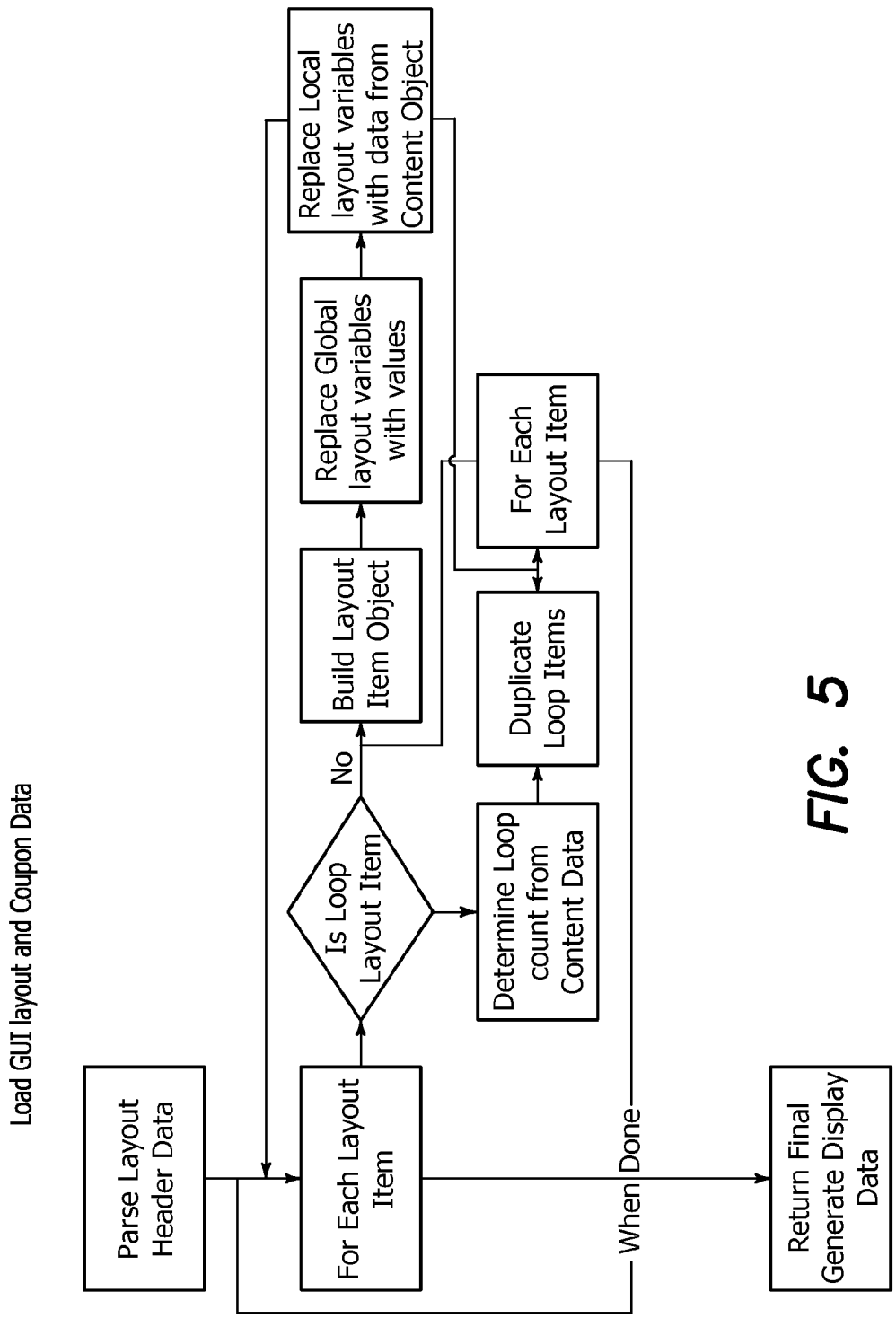
FIG. 5 is a flow chart illustrating loading a display layout and advertising data in one embodiment of the present invention.

Following parsing, the client tokenizes the advertising item, exams each header of a token to determine its type, and then process according to type, see FIG. 5. When the advertising item is displayed to the client at the portable device, the client indicates which content received to display next based on hard coded values or the client's input. The content and layout are then loaded by the client's portable device.

The client's portable device sorts through the layout and replaces any variables in the layout with data from the content. Layout constants are adjusted based on specific settings of the client's portable device. The layout is then passed with the adjusted values to a controller of the portable device. The controller follows instructions in the layout, and the instructions then paint the data onto the screen of the client's portable device. Client input is accepted by the controller, and instructions or commands are applied in the layout to decided what to do next. The layout maps each possible client input to a command string. When the client receives the command, the client loads and parses that command string which can consist of one or more commands. Each command is executed in order, effecting either the current screen, flow to another screen, causing the storing of data or causing a network operation to occur. These steps are then repeated for each screen that the client sees at its portable device.

An iteration is made over all of the elements in the layout. The type of each layout element is determined, and specific parsing code is used to properly expand the layout data into the element later to be displayed. Variables or constants found in the layout are then replaced with data from the content of a configuration file of the portable device. Equations found to calculate final values of specific elements in the layout are then executed. Equations can consist of constant numerical values, variable specific to the content, constants specific to the client portable device or variable specific to the current state of the layout. The calculations produce a final numerical value that is used in the display of an object. Looping objects are duplicated based on the number of content objects that exist, each of a sub-loop element value being loaded from a specific sub-content object.

Figure 6:
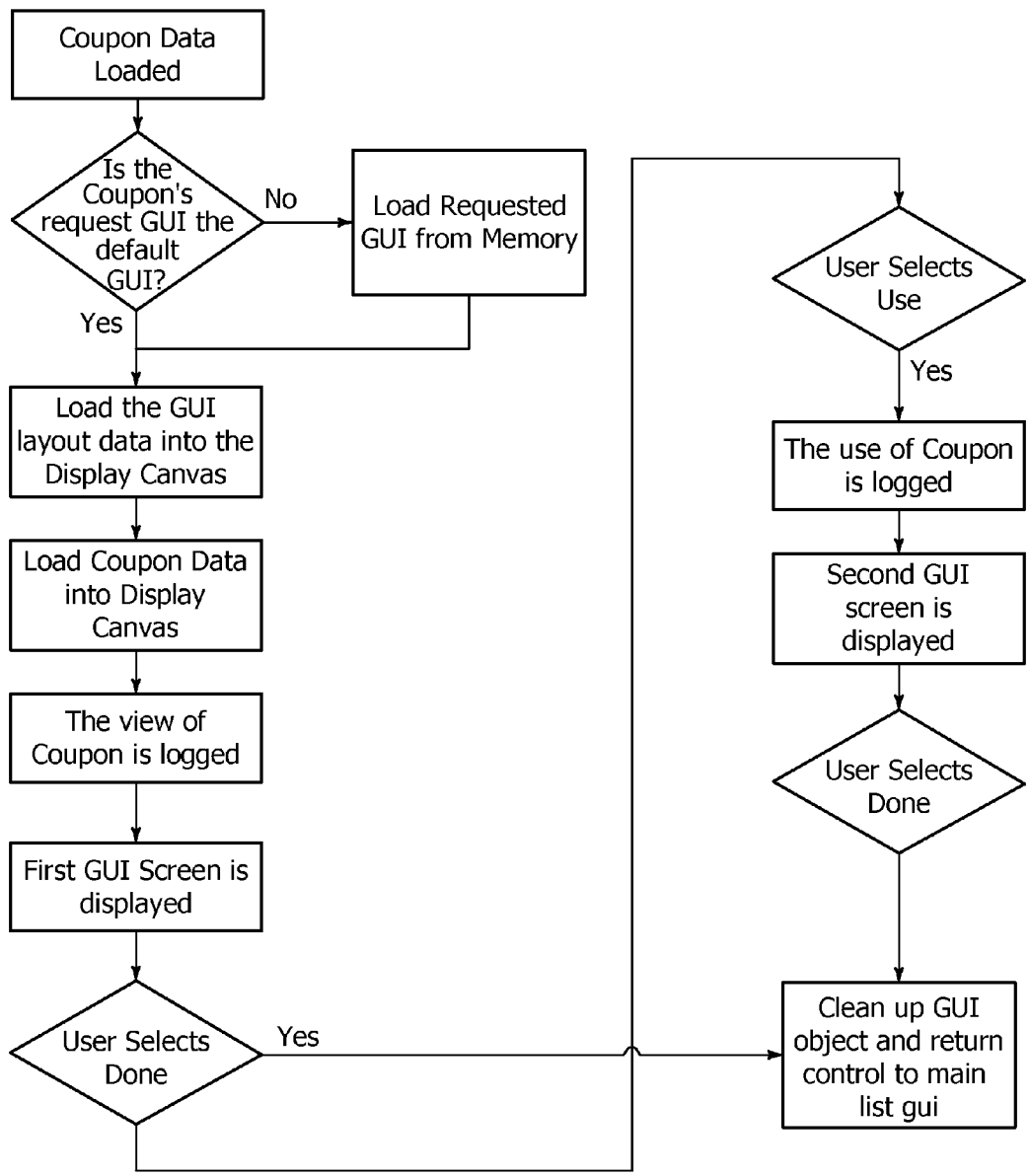
FIG. 6 is a flow chart illustrating one embodiment of uploading advertising items, such as coupons, of the present invention.

In response to client input to the portable device, the portable device loads an appropriate set of commands from the active layout and then executes those commands. A variety of commands can be utilized including but not limited to those that can, cause storage operation, network operations, screen operations flow control operations, and the like. One embodiment of a possible flow for loading, viewing and use of a coupon can be seen in FIG. 6.

In one embodiment, the commands are executed by specific portable device phone threads. The threads can include but are not limited to, timer threads that cause a command to be executed after a specific amount of time has passed, a network status thread, causing a command to be executed at various stages of network operation, a save storage status thread, the also causes a command to be executed at various stages of network operation, and other interrupt or restore threads.

In one embodiment, the host server functionality is broken down into several sections, including but not limited to, user management, advertising item distributor, campaign manager, client distribution, display management, and the like. The functionality needed can be divided other ways, this keeps the cleanest separation by enforcing the separation of clients from content, content management and other client details. This allows expansion or modification of one area while minimizing change in the others. In addition a controller exists for managing the network connection and sending incoming request data to the appropriate system, and appending its response to the set of responses due to be returned to the client. The controller is responsible for passing data between the separate sections, enforcing their separation by allowing communication via one known channel. In one embodiment of the present invention, Java is used with Java® Servlet technology and a structured query language (SQL) database for data storage. The host server can be written in other languages, including but not limited to in C/C++, Perl or several other languages. In addition, all changes to the database can be stored with timestamps and old data need not be deleted. Therefore, when a field needs to be updated, a new entry is created with a timestamp indicating the new data value. The old value is marked as no longer valid. In this way, a complete history of all data changes can be examined.

Figure 7:
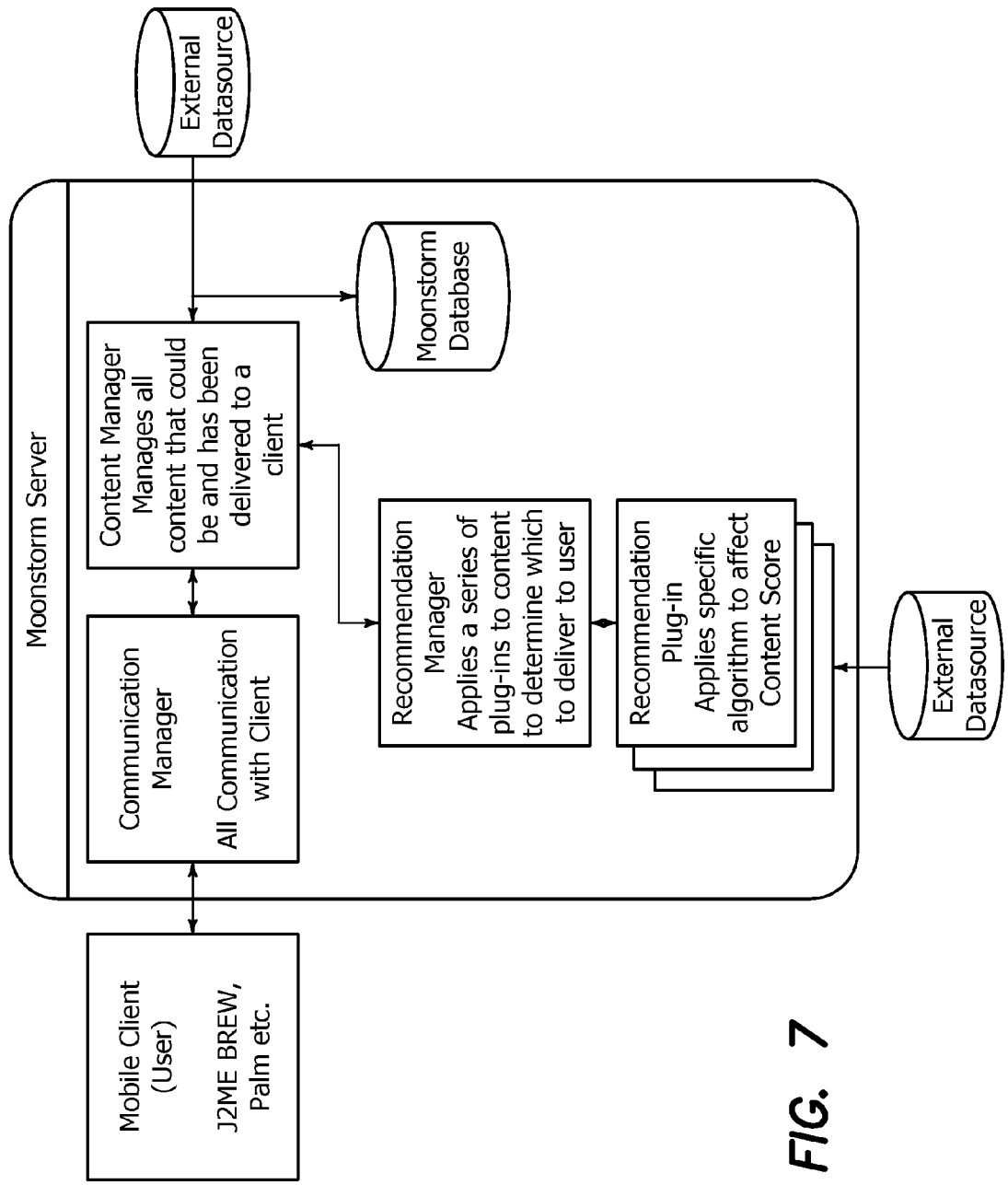
FIG. 7 is a flow chart illustrating one embodiment of a host server of the present invention.

FIG. 7 illustrates one embodiment of a high level overview showing how the host server parts relate to the client communications. In one embodiment, a controller is provided and accepts the incoming network request from a client, handles any decryption of incoming data, decodes the data and loads it into a data structure, and passes the data along the chain of systems. In each case the results of the run of one system are passed on to the next system. In one embodiment, the encoder encodes the end data, for the client, encrypts it and returns it to the client. It then terminates the network connection. The controller can also track the amount of data sent to and from a client and any attempts to illegally access the system.

Figure 8:
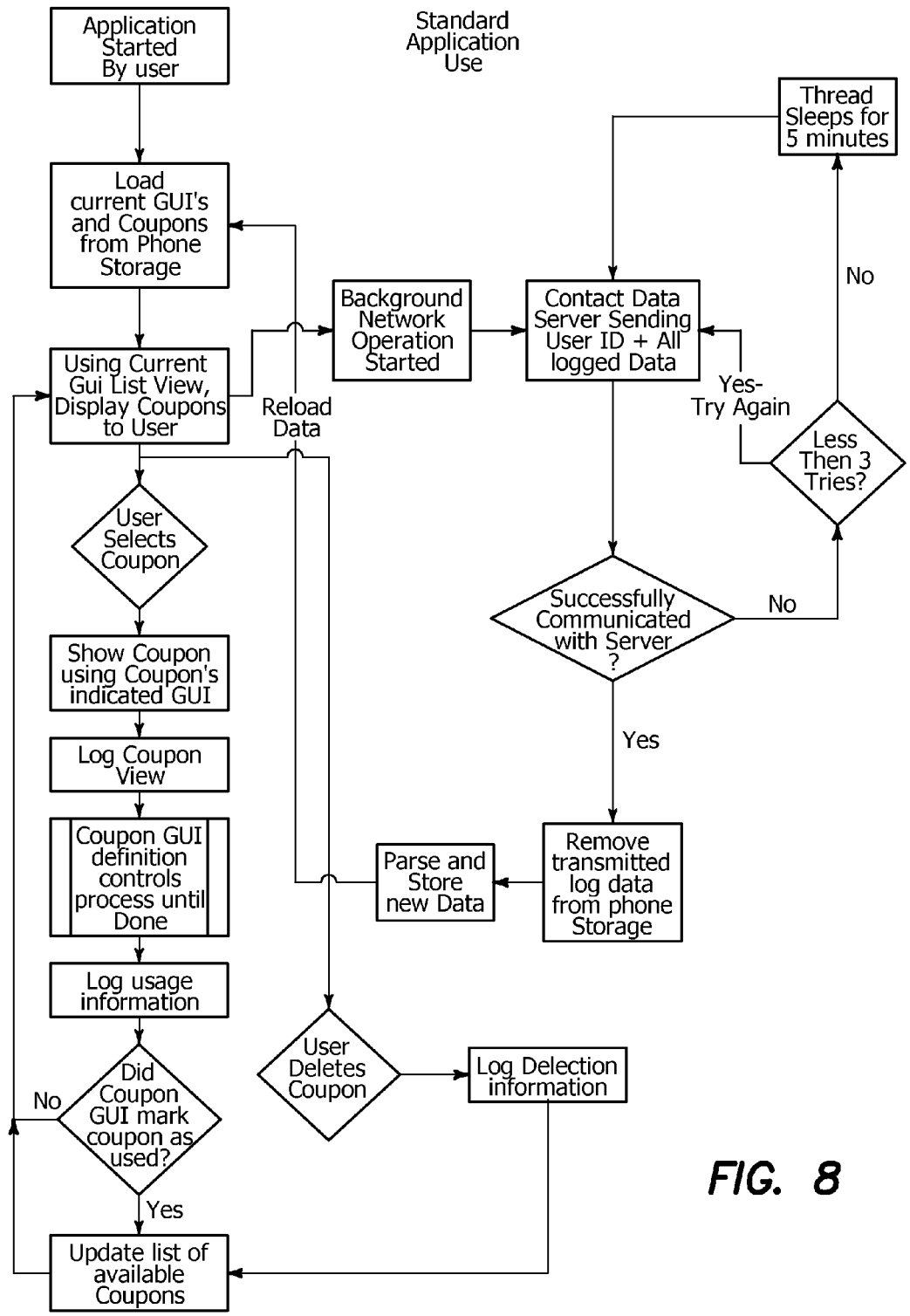
FIG. 8 is a flow chart illustrating one embodiment of an standard application use of the present invention.

A user management system ("UMS") is provided and is responsible for registering and verifying clients, tracking client information, including but not limited to, client location via GPS, device and software version, personal details, connection information, billing information and billing records, and also provides for the administration of the same. One embodiment can be see in FIG. 8.

In one embodiment, the UMS has two sets of access points, one used by the client and one used via a web browser to view and edit the client data. When contacted from the client, there are two major actions that can be performed. The first is the one time registration of a new client with the hose server. The client uploads to the UMS, the client's portable device identifier along with all information on model, type, free memory plus any data already gathered from the client, including but not limited to, gender, age or zip code. The UMS creates a new database entry for this client and assigns a unique client ID (UID). It also checks the client distribution system ("CDS") to see if there is any data about who referred this client and if they are seeking some specific coupon, and stores this information. It then returns to the device this UID which is stored for future communication.

The second type of action is a standard communication from a device processed through the controller. The UMS is responsible for verifying that a valid was sent, storing any data uploaded by the client that is related to the client and returning any commands to ask the client to request additional client information. After checking that the UID exists in the database and is currently active and valid (not marked as locked) the UMS parses the data passed in for personal client information. If it finds keys for values it is interested in, such as date of birth, gender, age, income, zip code, address, billing or credit card information, reward card information or other personal information the UMS adds it to the client record and removes it from the incoming information flow.

The UMS looks for location based information, including but not limited to GPS coordinates, received data from Bluetooth® transmitters, an Internet Protocol (IP) address assigned from a wireless or wired internet connection, where the location can be calculated or other data. This is then converted into a street address and stored along with the an accuracy range (where the GPS coordinates might give a three meter range, a Bluetooth® message a 3 foot range and an IP lookup might allow for a 1 mile radius or more) for access by other systems. In the case of the GPS coordinates, a map lookup will give a street address. For the Bluetooth® transmitted the location of the transmitter must already be known. For wired connections, by tracking the path that packets take, the closest router or server can be determined and based on the location of that server and the delay packets take to get from the client to that server, a location can be calculated. Finally for wireless, the location of the base station that the client is connecting to can be looked up.

The UMS then checks to see if the current rules suggest that it ask the client for additional personal information. For instance if the client has used the system for two weeks, several times a day, the internal rule set might suggest that this is a good time to ask them for the client's zip code. In addition the client might have performed an action that required more data. For instance, the client may have attempted to buy a prepaid purchase code that could be loaded on the client's portable device and the system need to request their credit card number. If any of these are true, the system adds to its outgoing command list a request to the client to ask the client for this information and if the information is optional or not.

The UMS processes any incoming requests that require a billing or debit action such as directly buying something via an ad, prepaying for a series of items, buying a discount of some type or other action. The UMS charges the client's credit card, paypal account, bank account or internal balance if it is a dollar charge, or debits internal reward balances if the client is using a reward points gained for use of coupons, viewing ads, sharing ads or other reasons. The UMS records this and adds the note of the successfully or unsuccessfully charge to the outgoing data. All of the results are then returned to the controller for future actions.

The ad distribution system ("ADS") is in charge of managing and delivering all item data to the client, including but not limited to ads, coupons, discount cards, prepaid charge numbers, and the like. The ADS receives the UID from the controller and the log data from the client. It first processes the log data, possessing records of advertising items deletions, such as coupon, from memory, marking those advertising items as removed from the client. Second it records views, uses and deletes of advertised items. All used and expired advertising items are marked to be deleted from the client memory and commands to do so are added to the outgoing command queue.

The ADS checks incoming data for any requests from the client for specific requested advertising items such as coupons, for instance if the client entered a code or otherwise indicated it wanted a coupon for a specific item or set of items either via the client or the web, or purchased items that need to be delivered, and adds them to the outgoing queue. The ADS checks if any advertising items have been explicitly sent to the client by another client and adds them to the queue in order.

Finally the ADS checks the database of available advertising items not yet delivered or planned to be delivered and selects a subset that best match the client's profile. This is a two step processes. First, available advertising items are filtered on client information such as age, gender, location (either zip code or location information processed by the client manager) and all advertising items whose distribution demographics requirements do not include the client are excluded. Advertising item data can include explicit restrictions or targets for one or more of these demographics that mean the advertising item would not be valid to be delivered under any normal circumstance to this client. Second, all remaining advertising items are given a score on a scale of 0.0-100.0 on how good a fit they are for the client. This includes filtering based on the same demographics as before except now using the suggested range information included in a coupon data.

By way of illustration, and without limitation, a coupon might only be allowed to be delivered to people age 18-45 of either gender but would prefer to reach age males 24-35 years old. In addition, the categories this coupon falls into are compared with ones this client has already used or not used (e.g., expired or deleted) and values are added or subtracted from the total score accordingly. The ADS then checks what other clients have used this coupon and if their coupon usage patterns and demographics match this client. For instance, if this coupon, perhaps one for diapers, was used by others who also used a coupon for baby formula, and this current client used the baby formula coupon, the score for this coupon for diapers would be increased. The greater the similarity between two clients, the more coupons in common they either used or did not use, the higher the score is increased for a coupon used by one but not by the other. This in turn is done for all clients who have a similarity, producing a final score.

Finally for any coupon that uses random values to provide rewards, a random number is chosen and the final values of the coupon are generated and a use code is assigned. In some cases this use code will be the same across all coupons, for example, a generic discount coupon that have the same UPC, and in other cases each have an a unique code. This allows one time use coupons, coupons that acted as cash or cash equivalents or any other situation where either individual tracking of coupon use at Point-of-Sale was critical or enforcing a one-time use policy was desired. The list of possible advertising items, such as coupons, is then sorted by score is returned to the controller.

In one embodiment of the present invention, the display manager has three primary functions. The three functions are, keeping track of what kind of list viewer the client has and how many advertising items it can handle, determining what displays and images are already installed on the client and how much free space is available for more and finally delivering any additional displays or images necessary to view new advertising items being delivered.

The display manager receives the UID and log information from client and advertising item information just generated by the ADS from the controller. The display manager first processes the log data, noting all deleted advertising items, images and displays and updates its understanding of how much space remains on the client for addition images, displays and ads. Second the display manger considers the current list view display installed on the client and if any new updated ones are available and, if so, adds them to the outgoing queue.

The display manager considers the list of advertising items from the ADS, first trimming the list by removing those with the lowest score until the list is of a size that the list display that is or will be installed can handle based on technical and human computer interaction (HCI) requirements. The display manger then proceeds thought the list from highest score to lowest, determining what additional display's or images are necessary for that advertising item. It continues until the total size of the additional data hits the maximum for the client. The display manger then adds the display's images and advertising items selected to the outgoing queue.

The display manager examines the list of deleted advertising items and current advertising items and decides which images and displays are no longer necessary for the client and appends to the queue commands to the client to delete the unnecessary ones. This data is then returned to the controller. At this point the controller sends the complete set of commands and data to the client and closes the network connection.

In addition to client access some of the systems or parts of the host server systems are accessed via a web browser for clients to view or edit data or request. These include the CDS, UMS and the ADS.

The CDS is a system for making the client available for download. One method for distributing the client is via SMS where a SMS is sent with a download link to the client hardware. When the link is followed the client is installed. The CDS has two parts, one getting this SMS message to a client and second hosting the link to download the client, as illustrated in FIG. 9.

In various embodiments of the present invention, an SMS is sent with the client download link in numerous methods. One is to request it via another client application already installed. The client enters a phone number of the portable device that should receive the SMS and the client transmits it to the CDS along with the UID of the requesting client for tracking purposes. The CDS logs this information and sends a SMS with a link to a servlet on the CDS server. The link has an unique ID embedded in it to track how many people use this link, if this SMS if forwarded to others.

The client download link can also be requested by sending a empty SMS message from the portable device in question to a specific number or short code which the CDS monitors and responds as above sending the SMS to the same device that sent the original SMS. Finally the phone number, email address or other contact information, and the like, can be entered in a web form. In addition the UID or phone number of the referred can be entered. Again an SMS, as described above, can be sent to the phone number in question. In all of these cases, a code could also be included either in the SMS message or on the website to indicate the client is signing up for a specific advertising item to start.

When a link in a SMS is followed, the CDS server receives the request, logs the ID in the download link and checks the header information passed with the browser request. Based on this information the CDS server decides which version of the application to deliver to the portable device in question, and sends a redirect request to the browser that points at the actual download uniform resource locator (URL) for this version of the client.

When a new client connects for the first time, the CDS can be checked to see who or what should receive credit for getting the client to the host server. If it is another client, it might receive some kind of credit or special advertising item while someone paid to sign up clients could be tracked to see how well they do their job. Additionally, the host server is checked for any special code to indicate that certain advertising items or data should be delivered as soon as possible. One embodiment of this flow. A client can also access its personal information and profile via the web. The UMS provides both authentication for web site login and the ability to view and edit certain information.

If a client desires access via the web site, the client enters the client's portable device ID on the site. The site then sends to the client a random password for the first login. This, combined with the client's portable device ID, allows the client access to the UMS and all other web based systems. The UMS acts as a universal authentication system for all the web systems. The UMS is responsible for providing basic authentication tools, the ability to change passwords, recover a lost password, and the like. Additionally, the client can view its personal profile, edit demographic data, provide addition demographic data, view billing information, update billing data and perform other tasks on their personal data.

The ADS can be partly accessible online. The client can see what advertising items it currently has, search the advertising item database for addition advertising items it wants to have downloaded, view previously used advertising item data and access other data. Additionally, the ADS is responsible for allowing advertising items to be sent to a specific client. As discussed before from within a client the present invention provides that a specific advertising item can be sent to another client.

There are two ways the ADS can be used. The first is where one client to sends an advertising item or set of advertising items to another client. By entering some unique information about the client, for instance an email address, device id, phone number or the like, and selecting the subset of advertising items it wants to send, the ADS records the fact that these advertising items were specifically requested by others, giving them a high score the next time that client's client connects to receive new data. Second, a client can follow an outside link from a website, email or other source that contains an advertising item ID. This takes the them to this ADS website where, by entering their client ID, can alert the system that the next time the client connects it wants the advertising item indicated by the ID in the link it followed. This link can be provided several ways including, by another client or by a corporation advertising its advertising items via email, a website, flyer or in another manner.

Referring to FIG. 3, in one embodiment of the present invention, a method is provided for producing a coupon recommendation to a client from a host that has a host server. Prior to loading client demographic and client historical data to the host server, data is processed from the client that includes client interactions with coupons delivered by the host server, any other client interactions with their client portable device including but not limited to, the time stamp of the interaction, the key used to cause the interaction, where possible the GPS location of the command, and all other data that can be extracted. A check is then made of the coupons to be delivered or removed for that particular client. Coupon data is then returned to a controller of the hose server to add to return data.

Client demographic and client historical data is loaded to the host server. Coupons are loaded from customers to the host server, as shown in FIG. 2. This loading can include selecting coupons that are currently valid in terms of date. Coupons that are no longer available are excluded and are not sent to the client. Coupons outside of a client's geographic region can also be excluded from those that are delivered to the client.

The client can be presented with a view of the coupons it currently has. At the same time, a network operation starts in the background, connecting to the host server and checking for new display's and new coupons. The host server can upload any information gained in response to client actions, including but not limited to, coupons viewed, used, deleted, the scrolling that took place, how often the application was started, exited, when a network conductivity failed, how long a client spent looking at any once screen, the interactions selected by the client, and any other client action performed on the display.

Figure 10:
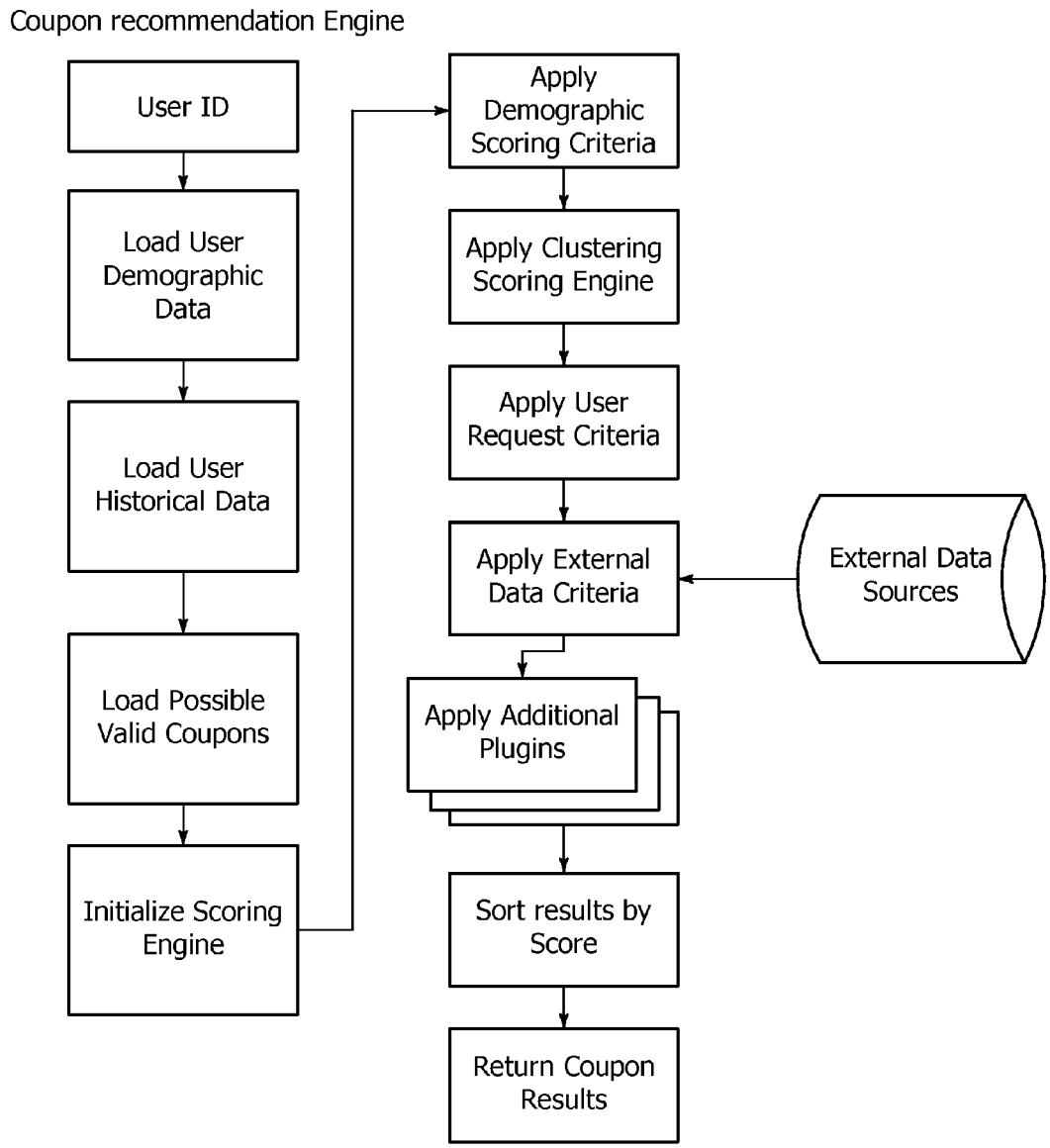
FIG. 10 is a flow chart illustrating one embodiment of a advertising item/coupon recommendation engine of the present invention.

FIG. 10 illustrates an embodiment of a recommendation engine that can be used with the present invention. Clustering scoring is applied to the loaded coupons. Client request criteria is applied to the coupons. The coupons are scored and sorted based on the scoring, creating scored coupons. Previous scores applied to scored coupons are combined and ranking the coupons are then ranked with these combined scores, from the highest to a lowest in terms of the score given. The number of coupons is determined that the client's mobile device can receive. Only the number of coupons are delivered to the client's mobile device that the mobile device is able to receive based on the ranking of the coupons from the highest to the lowest.

Selected coupon results are delivered from the scored coupons to a mobile device of the client in response to the scoring and sorting.

Demographic scoring criteria of the client are applied to the coupons. Customer request criteria can also be applied to the coupons. The application of the customer request criteria can be achieved by loading customer contract information to the host server. A coupon score is then increased or decreased based on the amount the customer pays for each coupon redemption and/or deliver. Coupon scores are then adjusted in response to preferences provided by customers to the host server. These preferences include, placement of coupons in a ranked ordering, preferred coupon display location on a screen of the mobile device, size and quantity of graphics used, fonts, client alerts, and the like.

In one embodiment, the step of applying client preferences includes utilizing client preferences to the scores of the coupons. In another embodiment, client category preferences are used to adjust coupon scores. Data sources can be used that are external to the host server to assist in the scoring of the coupons. By way of illustration, and without limitation, an external data source can be the purchasing history stored by a merchant on a specific client, historical and or geographic data on purchasing trends, real time data on current purchases, and the like. Customer data relative to a client can be used to assist in scoring the customer's coupons for that client.

In one embodiment, the host server formats coupon data by compacting into a custom client language to provide for efficient parsing of data, as discussed above.

In another embodiment of the present invention, a method is provided for loading a layout with advertising item data. Layout header data is parsed. A layout item object is then built. Global layout variables are replaced with values. Each unresolved global variable in the created object containing data structures is replaced with a global value from a settings file.

Local layout variables are replaced with data from content objects. Each local variable in the created object containing data structures is located. A look up is performed for variables in an associated content object. Variables are replaced from created objects that contain data structures with a value from the content object. Calculations associated with the variables are completed. At least a portion of the variable string representations are converted into another type of data.

Displayed data is then created. A determination is made for each layout item object to see if it is a loop layout item. The parsing layout header data includes, parsing out ID numbers that represent the layout. Global settings associated with the layout are also parsed out. In building a layout item object, layout component strings are parsed in a layout. Object containing data structures are created for each component string.

At least a portion of converted and non-converted data is painted onto the screen of a client's portable device. Each display set consists of a unique display ID and a set of one or more screens each with an ID unique within this set. In turn, each screen consists of a set of items that consist of but are not limited to, strings to display including font size, color and location; shape to draw, including which shape, location, color and fill if any; Image, including a unique image ID, location and if it is animated or not. In addition each item can be interactive or not and include one or more response's to an interaction, including reading or storing data, replacing itself with another item or other response. Also any value for a field can instead of a value have a id which can later be filled in by the coupon. Each screen can include a list of initial items to display. Instead of an absolute layout a relative layout can be used, either to other objects to the edge of the screen, such as by example using a layout manager, and the like.

By way of illustration, and without limitation, a simple display with one screen can be described as shown in Table 1 and a coupon driving it in Table 2.

TABLE 2

Coupon XML

```
<Coupon id=434 GID=101 >
    <Data name=DISCOUNT value=10 />
    <Data name=DISCOUNT_TYPE value=PERCENT_OFF />
    <Data name=COMPANY NAME value="Acme Warehouse" I>
    <Data name=BRIEF_DESC value="Get $10 off At Acme!" />
    <Data name=EXPIRE_DATE value="1/1/2006" I>
    <Data name=SMALL_PRINT value="Can not be combined with any other offers. Void where prohibited." />
</Coupon>'
```

It will be appreciated that the method set forth in Tables 1 and 2 is given by way of illustration, and other methods can also be utilized.

A display can be transmitted in a much more compact form, and in one embodiment, XML is used.

Figure 11:
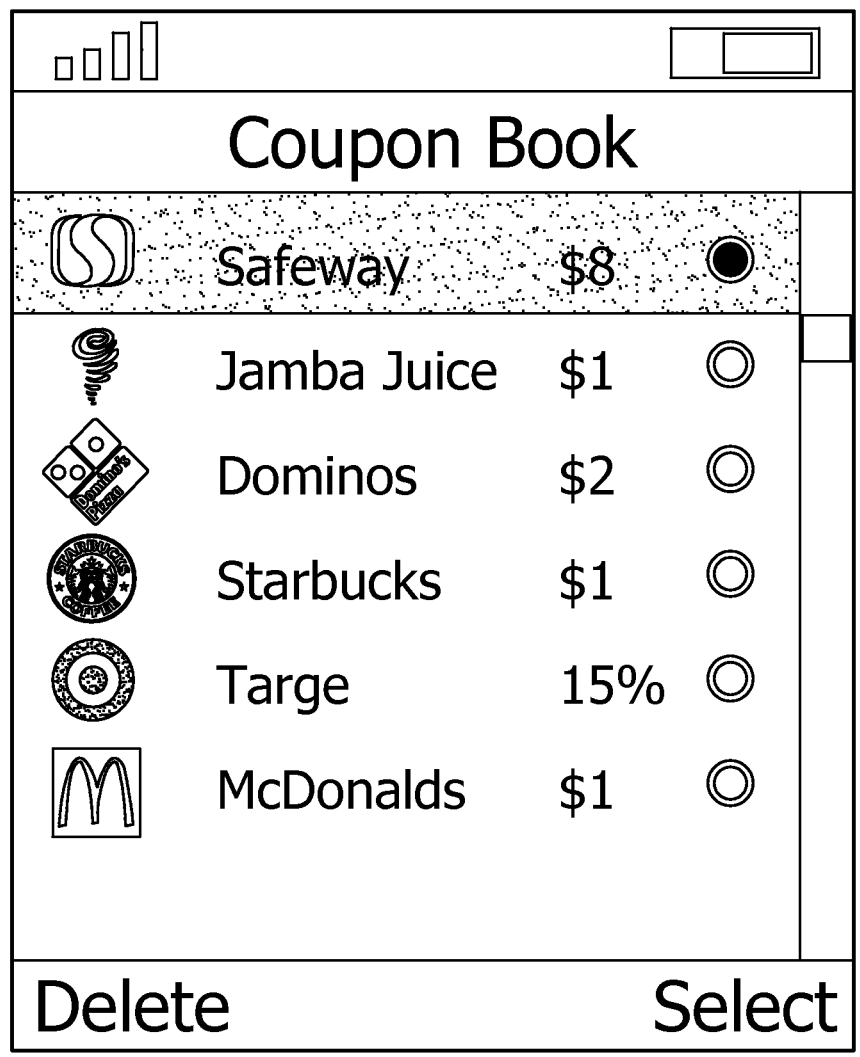
FIG. 11 illustrates one embodiment of a display received at a client's portable device of the present invention.

FIG. 11 illustrates one embodiment of a view illustrating an initial displayed screen. In this embodiment, the logo of the store or brand providing the discount is shown on the left, followed by the name of the same. An indication is provided of the type and amount of the discount. A colored dot indicates the length of time until the coupon expires, with green indicating a long time and orange indicating a short time.

In other embodiments, the coupons are broken down by categories, allowing the client to search coupons, to sort by discount or expiration date, grouping by brand or store, showing only a logo with a discount to allow more to be shown, giving more detail with a second line of small text below each

TABLE 1

GUI XML

```
<GIU id=101 DefaultScreen=ViewScreen>
    <Screen id=ViewScreen title="Coupon Book" log=VIEWED> <Image x=10
        y=10 iid=SCOUPON_LOGO I>
        <Text x=30 y=10 fsize=18pt string=$COMPANY_NAME I>
        <IF val1=$DISCOUNT_TYPE val2=PERCENT_OFF compare=equals> <TRUE>
            <Image iid=PercentIcon x=10 y=30/> </TRUE>
            <FALSE>
            <Image iid=DollarIcon x=10 y=30 I> </FALSE>
        </IF>
            <Text x=10 y=30 fsize=16 string=$DISCOUNT I>
            <Text x=10 y=40 fsize=14 string=$BRIEFDESC I>
        <IF val1=$EXPIRE_DATE val2=$TODAYS_DATE + 10
compare=greater_equals>
            <TRUE>
            <Image iid=GreenIcon x=10 y=50/>
            </TRUE> <FALSE> <Image iid=OrangeIcon x=10
            y=50/>
            </FALSE>
        </IF>
        <Text x=10 y=50 fsize=14 string="Expires $EXPIRE_DATE" /> <Text x=10 y=60
            fsize=10 string=$SMALL_PRINT I>
            <Button location=left text="Cancel" result=DONE I> <Button
    location=right text="Use" result=UseScreen I> </Screen>
    <Screen id=UseScreen title="Coupon Book" log=USED> <Image x=10
y=10 iid=$COUPON_LOGO I>
        <Text x=30 y=10 fsize=18pt string=$COMPANY_NAME />
        <IF val1=$DISCOUNT_TYPE val2=PERCENT_OFF compare=equals> <TRUE>
            <Image iid=PercentIcon x=10 y=30/> </TRUE>
            <FALSE>
            <Image iid=DollarIcon x=10 y=30 I> </FALSE>
        </IF>
        <Text x=10 y=30 fsize=16 string=$DISCOUNT /> <Text x=10
        y=40 fsize=14 string=$BRIEF_DESC I> <Barcode x=CENTER
        y=50 code=4353126
        </Image>
    </Screen>
</GUI>
``` line above, showing only those that could be used within a certain radius of the clients current location, and the like.

From this illustrated screen, the client can either delete or select a coupon. If the coupon is deleted, it is removed from the list. If the client views the coupon, the client is taken to the detail view that is defined by the display information associated with that coupon.

The display view then controls what is seen and responds to client's actions until the client indicates it is done viewing that coupon. At that point log information is updated, the list of coupons used is updated, and the client is returned to the list view. The display can support all advertising items. This includes any number of screens, each with any item or area on the screen being an interactor and allowing for animated images. The screen can support interactive coupons or ads including but not limited to, quizzes where right answers can lead to higher discounts, scratch off games, coupons with randomness, for example spinning a wheel to get a discount, or mini-games of any type with high scores leading to discounts, GPS based games where a client needs to reach certain coordinates to receive a discount, coupons or loyalty cards that require the client to reach the range, and the like.

In one embodiment of the present invention, a campaign management system (CMS) is provided for creating, managing and reviewing the results of advertising and advertising item campaigns, sales of discount cards or other digital items, sales of actual items and any other data that is presented to the client via the portable devices and the clients response to it. The CMS can be used by internal sales engineers or customers to detail what kind of campaign they want to run. In one embodiment, there are three parts to designing a campaign, the contents of the advertising item or ads, the target demographics and the number of advertising items or ads delivered and how often they should be delivered. Each of the parts can be combined in multiple ways to create a campaign. The results can be viewed either at this campaign level or for any piece. For instance, one can look across a series of campaigns to see how well a specific advertising item did.

The first step in the process of using CMS is creating an account for a customer. This is done once for each contract established and along with basic customer information it includes details on the length of the contract, negotiated base CPM (cost per thousand of advertising items delivered) and other details. Once done, accounts are also created for customers who need access to this system. Account types include but are not limited to, view results only, create campaigns and authorize campaigns with each later one including all the access of the previous account type.

The final task of the CMS is to provide real time results of a campaign status to clients. At any point a client can access the CMS and view how many advertising items have been delivered in relation to a specific campaign, how the distribution is spread across any of the demographic areas and again broken down by demographic who viewed, used or delete the advertising item. Finally they can see this information on a campaign level or a advertising item level. The data can be exported as comma delimited output for import into statistical packages or they can view charts and graphs generated by the CMS. Depending on the contact in place, only some part of this data might be accessible to the client, with extra fees required for a more detailed breakdown.

In addition to the CMS, certain embodiments of the present invention provide administration systems for managing clients, advertising items, displays, reports produced based on these results and the like. These are designed for use by the staff only and provide complete access to most of the data fields storied in the database. Via a web interface, these values can be updated and modified. With the exception of the display upload tool, these tools would only be used infrequently for modifications to fix errors.

The customer does not have to create every discount. The CMS can tie into the customer's inventory and sales tracking system. Based on current inventory needs, current selling patterns, under stocked or over stocked items and the like, discount coupons or other targeted ads can be delivered or not delivered to their appropriate clients to help balance the customer's inventory.

Figure 12:
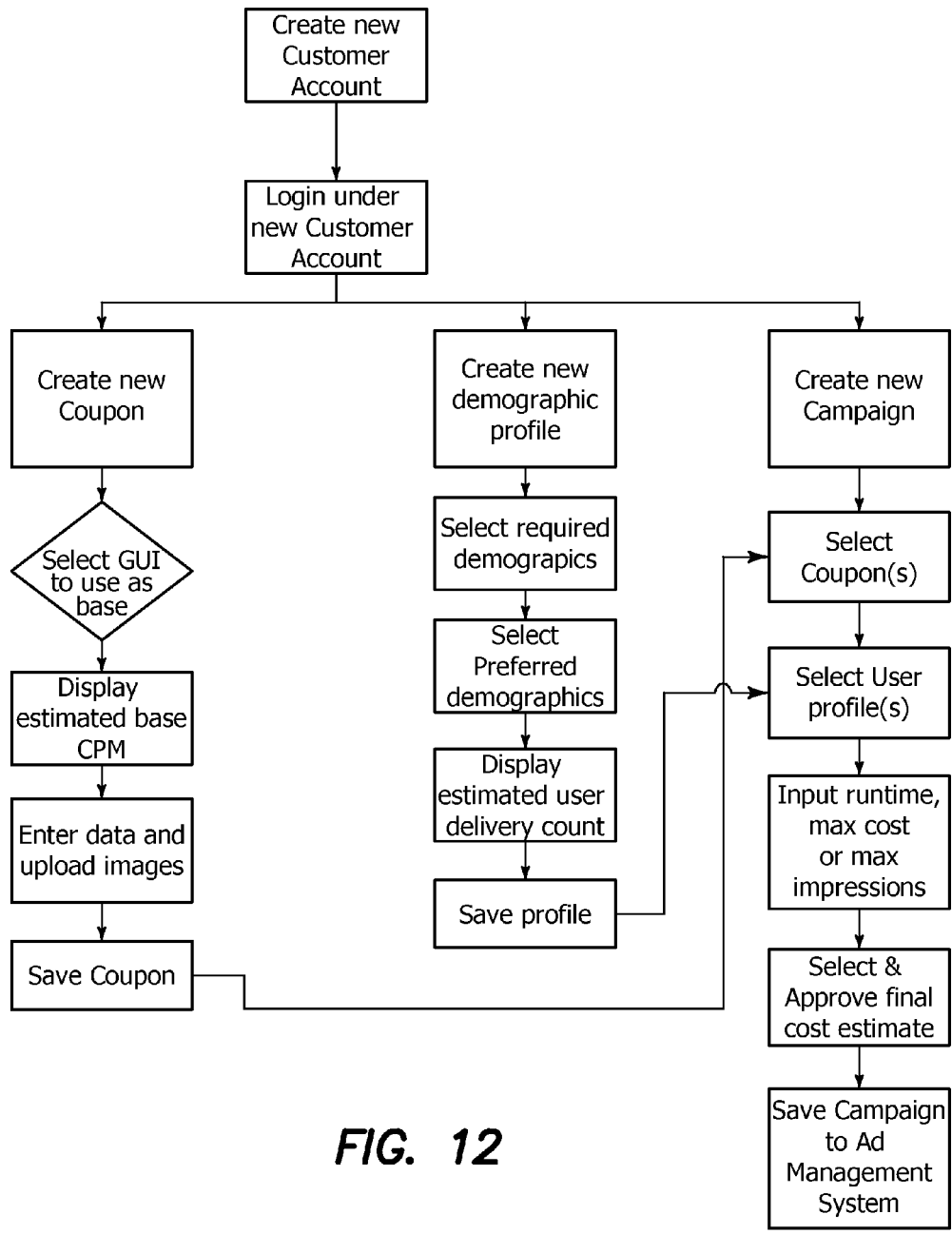
FIG. 12 is a flow chart illustrating one embodiment of a campaign management system of the present invention.

In another embodiment of the present invention, generally illustrated in FIG. 12, a method is provided for allowing customers to manage their advertising campaigns. A client delivered advertising item is delivered relative to a product or service of a customer. A layout is selected to use as a base for content display. Data is entered and uploading images are uploaded to fill spaces in the selected layout. The entered data and uploaded images are saved and named. A customized layout can be created for a customer's advertising item.

A new demographic profile is created for client targeting. Customers are provided with an opportunity to select client demographic parameters. Customers are also provided with an opportunity to select scores for preferred client demographic data. An estimated delivery count of content of the advertising item is displayed. Customers can then repeat the first two steps in this paragraph. Optional boosters can be selected to increase delivery probabilities of the advertising item. The boosters are selected from at least one of, placement of coupons in a ranked ordering, preferred coupon display location on a screen of the portable device, size and quantity of graphics used, fonts, client alerts, and the like. A demographic profile is saved and named by the customer.

A new advertising campaign is created that links content deliverables and demographic profiles relative to the advertising item. Saved and named entered data and uploaded images are selected. Saved and named demographic profile are also selected. Start and end dates are established for the advertising campaign. Maximum costs or impressions of clients relative to the advertising item for the advertising campaign are indicated. The customer then approves a final advertising campaign.

Final advertising campaign data is sent to the host server. The new advertising campaign is launched. The advertising campaign results are then viewed by the customer. Customer's are provided with access to advertising campaign results. The customer can then view at least one of, number of discounts redeemed, number of discounts viewed, demographic breakdown of users who redeemed or viewed; geographic breakdown of the above, temporal breakdown of the above, total costs of the advertising campaign, and the like.

The first step to creating an advertising campaign is defining the actual advertising item such as a coupon or ad. This is done first by selecting the base display that will be used. The display comes up on the screen with blank spaces where text, images or other dynamic data will go. At this time the host server provides a base CPM based on the complexity of the display selected and the current contract. The client names the advertising item and then fills in, uploads and otherwise provides all the necessary data for blank spaces. In interactive advertising items, for instance ones with random rewards, percentages are also given for the probabilities of any one reward coming up. This finished advertising item is then saved.

The second step is creating a demographic description of the target group. This is not linked to the advertising item in any way at this point. The client names their demographic group and then can add criteria in two ways. First, they can absolutely restrict their distribution by indicating ranges or choices in demographics, for instance that a advertising item should only be delivered to people ages 22-48. In addition, however, they can also indicate preference, for instance delivering the advertising item to people age 28-38 should take priority. As they make changes the system checks the data with the host server and reports how many clients match the criteria chosen so far.

In another embodiment of the present invention, a method is provided of downloading advertising items from a host server to a portable device of a client. A client's device information, relative to the client's portable device, is received at the host server. A determination is made, from the client's device information, the model or version of the client's portable device. In response to the step of determining, a client ID is embedded in the client's portable device. Client software is delivered from the host server to the client's portable device. The client software is used for downloaded advertising items relative to a product or service from the host server to the client's portable device. By way of illustration, and without limitation, the client software can be written in J2ME® (Java2™ Portable Edition), be ported to Symbian®, BREW® (Binary Runtime Environment for Wireless®), Palm® OS and Microsoft®.NET for Windows CE®, and the like. In addition as new portable device OS's and development languages evolve the client software can be easily ported to them as well. By way of illustration, and without limitation, the J2ME® application can installed onto a cell phone by sending an SMS message to the phone with a download link. The client selects the link and then automatically installs the software. However, the URL can also be entered by hand in the devices web browser or the software could be transferred over a download cable.

In one embodiment of the present invention, a display upload tool ("GUT") is provided. For advertising items the GUT takes the XML file (like the type above) and uploads it into the CMS, making it available as a choice when designing a advertising item. However, for display's to replace the list view, while an XML file is again uploaded, additional data has to be provided. A display controller is told how to distribute the new list view. For instance, it might only be to certain demographics (for example people under 18), or to a certain random percentage of the client base (for testing) or only if more then a certain number of advertising items are kept on the portable device.

The foregoing description of embodiments of the present invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

We claim:

1. A method for loading a layout with advertising item data, comprising:
    parsing, by a computing apparatus, a layout header data that represents a type of layout selected to display an advertising item onto a screen of the computing apparatus;
    building, by the computing apparatus, a layout item object that corresponds to the layout identified by the layout header data, wherein the step of building a layout item object includes:
        parsing a plurality of layout component strings in the layout; and
        creating an object containing a plurality of data structures for each of the component strings in the layout;
    replacing, by the computing apparatus, a plurality of global layout variables in the object with a plurality of values;
    replacing, by the computing apparatus, a plurality of local layout variables in the object with data from a plurality of content objects, wherein the step of replacing the local layout variables with data from the content objects includes:
        locating each of the local layout variables in the object containing the data structures;
        looking up the local layout variables that are in an associated content object; and
        replacing the local layout variables from the object containing the data structures with a value from the associated content object;
    associating, by the computing apparatus, at least a first command string with a first user input based on information in the layout that specifies the association;
    causing, by the computing apparatus, the advertising item associated with the layout to be displayed onto the screen of the computing apparatus based on the replaced local layout variables;
    receiving, by the computing apparatus, the first user input;
    identifying, by the computing apparatus, a first command to be performed based on the association between the first command string and the first user input;
    causing, by the computing apparatus, the first command to be performed;
    causing, by the computing apparatus, a communication link to be established with a remote computer via a network;
    comparing, by the computing apparatus, a set of coupons to be deleted with a set of current coupons;
    receiving, by the computing apparatus from the remote computer via the communication link, a command queue comprising one or more commands to be performed, wherein the command queue comprises at least a first command to delete an image that is no longer needed to display a coupon, and wherein the image that is no longer needed is identified based on the comparison; and
    causing, by the computing apparatus, the one or more commands to be performed, wherein causing the one or more commands to be performed comprises deleting the image.

2. The method of claim 1, wherein the advertising item data is selected from, a list of merchants, a special event data, a coupon, an ad, a contest, and a loyalty card.

3. The method of claim 1, further comprising:
    determining for each layout item object if it is a loop layout item.

4. The method of claim 3, wherein each layout item object is duplicated based on a number of content objects when the layout item object is a loop layout item.

5. The method of claim 1, wherein the step of parsing the layout header data that represents the type of layout selected to display the advertising item onto the screen of the computing apparatus includes parsing out identifier (ID) numbers located within the layout header data that represent the layout.

6. The method of claim 1, wherein the step of replacing the global layout variables in the object with the values includes replacing with a global value from a settings file for each of the global variables in the object containing the data structures.

7. The method of claim 1, the method further comprising:
    completing one or more calculations associated with the local layout variables.

8. The method of claim 1, wherein the computing apparatus is a cell phone.

9. The method of claim 1, wherein the first command causes an update to a current screen that is displayed, causes another screen to be displayed, causes data to be stored, or causes a network operation to occur.

10. The method of claim 1, wherein identifying the first command to be performed based on the association between the first command string and the first user input comprising:
   parsing the first command from the first command string after the first user input has been received.

11. The method of claim 1, wherein the command queue further comprises at least a first command to delete an expired or used coupon, and wherein causing the one or more commands to be performed further comprises deleting the expired or used coupon from the computing apparatus.

12. The method of claim 1, wherein the command queue further comprises at least a first command to add a coupon requested by the computing apparatus.

13. The method of claim 12, wherein the coupon requested by the computing apparatus is made via a Short Message Service message.

14. The method of claim 1, wherein the command queue further comprises at least a first command to add a coupon requested by a device different from the computing apparatus.

15. The method of claim 1, wherein the command queue further comprises at least a first command to add a coupon requested, by a user of the computing apparatus, via a website link.

* * * * *